United States Patent [19]

Kamohara et al.

[11] Patent Number: 4,814,011
[45] Date of Patent: Mar. 21, 1989

[54] INVESTMENTS FOR DENTAL CASTING

[75] Inventors: Hiroshi Kamohara; Shohei Hayashi, both of Tokyo; Nobukazu Ohi, Fuchu, all of Japan

[73] Assignee: G-C Dental Industrial Corp., Tokyo, Japan

[21] Appl. No.: 119,778

[22] Filed: Nov. 12, 1987

[30] Foreign Application Priority Data

Dec. 3, 1986 [JP] Japan .................. 61-286747

[51] Int. Cl.4 ............................. B22C 1/08
[52] U.S. Cl. .......................... 106/38.51; 106/35; 106/114; 106/121; 501/1
[58] Field of Search ............. 501/87, 96, 1; 106/35, 106/38.51, 114, 121

[56] References Cited

U.S. PATENT DOCUMENTS 3,649,732  3/1972  Brigham et al. ............ 106/35 X
4,235,633  11/1980  Tomioka et al. ............ 106/35 OR
4,604,142  8/1986  Kamohara et al. ......... 106/35 X

FOREIGN PATENT DOCUMENTS 0122409  7/1984  Japan ............................ 106/35
1073772  6/1967  United Kingdom ....... 106/38.51

Primary Examiner—William R. Dixon, Jr.
Assistant Examiner—Karl Group
Attorney, Agent, or Firm—Oblon, Fisher, Spivak, McClelland & Maier

[57] ABSTRACT

An investment for dental casting comprises a mixture of at least one refractory selected from alumina, zirconia, magnesia clinker, quartz, cristobalite and fused quartz with either a mixture of a soluble phosphate with magnesium oxide or hemi-hydrate gypsum, which act as a binder. The investment of the invention further contains 0.5 to 5 parts by weight of raw starch (original starch) and 0.1 to 50 parts by weight of at least one selected from the group consisting of carbides, nitrides, borides, silicides and sulfides of transition metals of Groups IV, V and VI in the periodic table, which are added as expanding agents to 100 parts by weight of the aforesaid mixture. The investment of the invention may still further contain 0.1 to 1 part by weight of soluble starch.

28 Claims, 1 Drawing Sheet

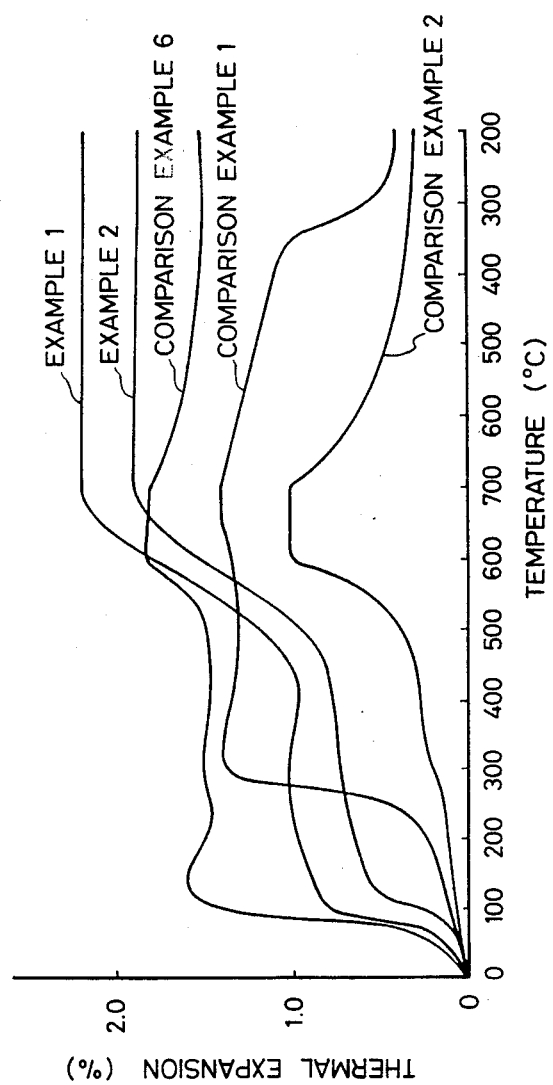

INVESTMENTS FOR DENTAL CASTING

BACKGROUND OF THE INVENTION

1. Field of the Invention

The present invention relates to an investment for dental casting, which is used as the casting material in the preparation of dental metal prostheses such as crowns, inlays and bridges by the precise casting process.

2. Statement of the Prior Art

Hitherto, dental metal prostheses have been made by the precise lost-wax casting process which assures excellent dimensional accuracy. Investments used as the casting materials in this case are generally broken down into gypsum base ones used with alloys having a relatively low melting point such as gold alloys, silver alloys and gold-silver-palladium alloys and phosphate base ones used with alloys having a relatively high melting point such as Ni-Cr base alloys and noble metal base alloys for porcelain fused materials. However, such investments have offered the following problems.

(1) The conventional investments make up for the casting shrinkage or contraction of metals by a combination of solidification expansion (including hygroscopic expansion) with thermal expansion. However, a part of the solidification expansion takes place unevenly enough to deform the wax pattern, resulting in the deformation of the resulting casting.

(2) The thermal expansion of quartz or cristobalite used as the refractory in the conventional investments is dependent upon heating temperature and is reversible. Thus, when a certain time elapses before the investments heated in an electrical furnace are cast by means of a casting machine, the investments are cooled down to a temperature much lower than 700° C. at which the burning-out of wax takes place, until they are actually cast. In the meantime, the amount of thermal expansion tends to decrease. Especially when the mould is cooled down to about 300° to 400° C. following the burning-out of wax at 700° C., as is the case with the casting of alloys having a melting point of about 500° to 700° C. such as silver alloys or silver-indium alloys, castings having suitable fitting accuracy are not obtained due to insufficient thermal expansion.

(3) A large amount of cristobalite is incorporated into the conventional investments so as to obtain thermal expansion. Since such thermal expansion occurs rapidly in the phase transformation temperature region, however, the moulds used become susceptible to cracking. As a result, cracking often occurs in the castings. This becomes marked especially when the rate of heating of the moulds is high in the phase transformation temperature region.

(4) For the purpose of bettering the reproducibility of the surface state of the wax pattern, it is required that the refractory particles be fined down to improve the heat resistance and surface of the castings. However, this gives rise to a decrease in the air permeability of the investments, which often leads to casting defects such as casting insufficiency. The flowability of the investments also drops in a slurried state so that difficulty is experienced in the investing manipulation of the wax pattern. For these reasons, it is impossible to fine the refractory particles down to lower than a certain particle size.

(5) Hemi-hydrate gypsum is used as the binder, when casting alloys having a relatively high melting point such as Ni-Cr base alloys or noble metal base alloys for porcelain fused materials. Since such hemi-hydrate gypsum tends to decompose thermally and be deposited to the casting surface, however, it is required to remove the deposited hemi-hydrate gypsum by means of a sandblaster, etc.

(6) In order to prevent surface roughening of the investments due to rapid evaporation of the in-mould moisture content after the investment of the wax pattern, the moulds have to be dried at 100° C. or lower. With the conventional investments, however, much time is required for drying, since the rate of temperature increase in the moulds is low due to their poor thermal conductivity.

In view of the foregoing, the present inventors have already proposed, in Japanese patent application No. 59-138942, (U.S. Pat. No. 4,604,142) an investment for dental casting obtained by adding raw starch (original starch) with or without soluble starch to a mixture of hemi-hydrate gypsum with quartz and/or cristobalite. As disclosed therein, such an investment expands uniformly through thermal expansion alone to make up for the casting contraction of metals, allows the refractory particles to be divided finely without any decrease in the air permeability thereof, and shows suitable flowability in a slurried state.

It is admitted that the investment disclosed in Japanese patent application No. 59-138942 (U.S. Pat. No. 4,604,142) expand uniformly only by way of the thermal expansion involving the thermal expansion of raw starch (original starch) and the thermal expansion of quartz and cristobalite by phase transformation so as to compensate for the casting contraction of metals, allow refractory particles to be fined down without any decrease in the air permeability thereof, and show suitable flowability in a slurried state. However, there is still left much to be desired in view of:

(1) Insufficiency in the amount of thermal expansion, when cooling the investment in the casting of silver alloys, for instance.

(2) Occurrence of cracks in the investment, when heating it for the purpose of burning out wax.

(3) Deposition of the investment due to the casting surface, when casting an alloy having a high melting point. and, (4) Drying of the mould over an extended period of time.

The insufficiency in the amount of thermal expansion of the prior art investment and the cracking therein are considered to be due to the fact that the prior art investment (Japanese patent application No. 59-138942) (U.S. Pat. No. 4,604,142) is thermally expanded through a combination of the expansion of raw starch (original starch) with the expansion-by-phase transformation of quartz or cristobalite. In Japanese patent application No. 59-138942, (U.S. Pat. No. 4,604,142) no attention is paid to the deposition of the investment onto the casting surface or the prolonged drying of the mould used.

SUMMARY OF THE INVENTION

To improve the dental investment disclosed in Japanese patent application No. 59-138942, the present inventors have made studies for the purpose of developing an investment for dental casting, which satisfies all the following properties:

(1) The amount of expansion sufficient to compensate for the casting shrinkage of metals should be attained through uniform thermal expansion.

(2) The amount of thermal expansion should not be reduced to an insufficient level, even when the investment is cooled.

(3) Any cracking should not occur in the investment at the time of heating for the burning-out of wax.

(4) The investment should excel in air permeability, and be of sufficient heat resistance.

(5) The investment should show satisfactory flowability in a slurried state.

(6) The investment should not be deposited onto the casting surface. and, (7) The drying time of the mould should be curtailed.

According to the present invention, the aforesaid purpose is achieved by the provision of an investment for dental casting comprising a mixture of at least one refractory selected from the group consisting of alumina, zirconia, magnesia clinker, quartz, cristobalite and fused quartz with either a mixture of a soluble phosphate with magnesium oxide or hemi-hydrate gypsum, which act as a binder, in which raw starch (original starch) and at least one selected from the group consisting of powdery carbides, nitrides, borides, silicides and sulfides of transition metals of Groups IV, V and VI in the periodic table and, optionally, soluble starch are added as the expanding agents to said mixture.

BRIEF DESCRIPTION OF THE DRAWINGS

The drawing shows thermal the expansion curves of Examples 1 and 2 according to the present invention and of Comparison Examples 1, 2 and 6 according to the prior art.

DETAILED DESCRIPTION OF THE INVENTION

As the expanding agents, use should be made of raw starch (original starch) and at least one, in the powdery form, selected from the group consisting of carbides, nitrides, borides, silicides and sulfides of transition metals of Groups IV, V and VI in the periodic table. The raw starch (original starch) first swells at about 75° to 110° C. to thereby thermally expand the investment, and the carbides, nitrides, borides, silicides and sulfides of transition metals of Groups IV, V and VI in the periodic table are then oxidized at 400° to 700° C. into the corresponding oxides to thereby thermally expand the investment. Since such thermal expansion is irreversible, the amount of thermal expansion at 700° C. can be maintained, even when the investment is heated to 700° C. and then cooled down to about 300° to 400° C. so as to cast a silver alloy, for instance. It is understood that while the transition metals of Groups IV, V and VI in the periodic table show similar effects, their powders are so chemically active that they are unstable even at original temperature and, hence, practically unsuitable. During heating, the thermal expansion of the investment takes place at about 75°-110° C. and about 400° to 700° C. in a two-stage manner, since the thermal expansion for making up for the casting contraction of metals is attained through the expansion of raw starch (original starch) and the expansion-by-oxidation of the carbides, nitrides, borides, silicides and sulfides of transition metals of Groups IV, V and VI in the periodic table without recourse to the thermal expansion of quartz and cristobalite by phase transformation. In addition, as a result of the thermal expansion temperature regions of both the expanding agents being not close to each other, the investment expands relatively gently to the amount of expansion for making up for the casting contraction of dental metals. It is thus unlikely that the mould may crack, or the casting may be burred.

The carbides, nitrides, borides, silicides and sulfides of transition metals of Groups IV, V and VI contained in the investments are converted to the corresponding stable oxides having a high melting point by oxidation, and are effective to reduce the burning deposition of the investments, since such oxides are not thermally decomposed, even when casting an alloy having a relatively high melting point. Thus, the investments according to the present invention show the thermal expansion that occurs uniformly and possesses the aforesaid advantages without making use of any uneven solidification expansion (including hygroscopic expansion), as experienced in the prior art. Further, since the compounds of the aforesaid transition metals of Groups IV, V and VI in the periodic table are extremely stable at around 100° C. and excel extremely in thermal conductivity, the thermal conductivity of the mould is improved by the addition thereof to the investments, whereby the drying time of the mould can be reduced.

When the investment according to the present invention is heated to the ring temperature applied at the time of casting following the burning-out of wax, on the other hand, the raw starch (original starch) contained therein burns out completely. In consequence, since very fine voids are left in the portion of the investment occupied by the raw starch (original starch), the air permeability of the investment is further improved, even when the refractory particles are fined down. Hence, since the refractory particles can be fined down, there is an increase in the proportion of the refractory particles on the surface of the wax pattern. Thus, the investments of the present invention may be used with a wide range of alloys from silver, gold and gold-silver-palladium alloys having a relatively low melting point to high-melting nickel-chromium base alloys, high-melting noble metal base alloys and high-melting quasi-noble metal base alloys. As mentioned above, the expanding agents incorporated into the investments of the present invention have various advantages. However, the addition in a small amount of soluble starch betters the flowability of the investments in a slurried state, and improve the investing manipulation. The raw starch (original starch) used in the present invention is an unmodified starch, and such modified starch as dextrin produces no thermal expansion effect. The raw starch (original starch) used in the present invention includes, for instance, potato starch, corn starch, wheat starch, rice starch, sweet potato starch and cassava starch which may be employed alone or in admixture. However, particular preference is given to potato starch.

Usable as the carbides of transition metals of Groups IV, V and VI in the periodic table are powdery titanium, zirconium, hafnium, vanadium, niobium, tantalum, chromium, molybdenum and tungsten carbides, etc., by way of example.

Usable as the nitrides of transition metals of Groups IV, V and VI in the periodic table are powdery titanium, zirconium, hafnium, vanadium, niobium, tantalum, chromium, molybdenum and tungsten nitrides etc., by way of example.

Usable as the borides of transition metals of Groups IV, V and VI in the periodic table are powdery titanium, zirconium, hafnium, vanadium, niobium, tantalum, chromium, molybdenum and tungsten borides etc., by way of example.

Usable as the silicides of transition metals of Groups IV, V and VI in the periodic table are powdery titanium, zirconium, hafnium, vanadium, niobium, tantalum, chromium, molybdenum and tungsten silicides etc., by way of example.

Usable as the sulfides of transition metals of Groups IV, V and VI in the periodic table are powdery titanium, zirconium, hafnium, vanadium, niobium, tantalum, chromium, molybdenum and tungesten sulfides etc., by way of example.

The soluble starches treated with mineral acids or oxidizing agents such as soda hyperchlorite and chloride of lime without causing gelation of raw starch (original starch) may be used alone or in admixture. However, particular preference is given to the soluble starch treated with soda hyperchlorite.

The refractory materials used for the investments of the present invention may be at least one selected from the group consisting of the raw materials for usual refractories, i.e., alumina, zirconia, magnesia clinker, quartz, cristobalite and fused quartz, and imparts refractory properties to the investments. Since the thermal expansion of quartz and cristobalite is essential to the conventional investments and the investment disclosed in Japanese patent application No. 59-138942, the refractories to be used are exclusively limited to quartz and cristobalite. In accordance with the present invention, however, since the thermal expansion of the investments occurs through the thermal expansion of both the raw starch (original starch) and the aforesaid carbides, nitrides, borides, silicides and sulfides of transition metals of Groups IV, V and VI in the periodic table, any refractory possessing heat resistance may be used regardless of the amount of thermal expansion. More specifically, use may be made of not only quartz and cristobalite but also alumina, zirconia, magnesia clinker, fused quartz and the like. Of these refractories, alumina, zirconia, magnesia clinker and fused quartz are advantageous in that they improve the heat resistance of the moulds used owing to their high heat-resistant temperature.

Usable as the binder is either a mixture of a soluble phosphate with magnesium oxide or hemi-hydrate gypsum as heretofore used in the prior art. In Japanese patent application No. 59-138942, the binder is exclusively limited to hemi-hydrate gypsum for the reason that when the mixture of soluble phosphate with magnesium oxide is used as the binder, the amount of raw starch (original starch) used as the sole expanding agent should be larger than required in the case where hemi-hydrate gypsum is used as the binder so as to attain the predetermined thermal expansion, with the result that the surface of the casting roughens. In the present invention, however, since the thermal expansion of the investment is attained through the thermal expansion of both the raw starch (original starch) and the aforesaid compounds of transition metals of Groups IV, V and VI in the periodic table, it is unnecessary to use a larger amount of natural starch, so that the casting is very unlikely to roughen on its surface. This makes it possible to use as the binder not only hemi-hydrate gypsum but also the mixture of a soluble phosphate with magnesium oxide. The mixture of a soluble phosphate with magnesium oxide is preferably used in the case where the mould is required to possess heat resistance, since it is superior in heat resistance to hemi-hydrate gypsum.

Suitably, the added amount of raw starch (original starch) and at least one selected from the powdery carbides, nitrides, borides, silicides and sulfides of transition metals of Grops IV, V and VI in the periodic table used as the expanding agent is 0.5 to 5 and 0.1 to 50 parts by weight respectively per 100 parts by weight of a mixture of at least one refractory selected from alumina, zirconia, magnesia clinker, quartz, cristobalite and fused quartz with either the mixture of a soluble phosphate with magnesium oxide or hemi-hydrate gypsum used as the binder.

This is because when the amount of raw starch (original starch) added is below 0.5 parts by weight, the amount of expansion cannot make up for the contraction of metals, whereas when it exceeds 5 parts by weight, the casting roughens on its surface. Referring to the amount to be added of the carbides, nitrides, borides, silicides and sulfides of transition metals of Groups IV, V and VI in the periodic table, cracking occurs in the mould used and the casting tends to be burred, when it is below 0.1 part by weight, whereas the surface of the casting roughens, when it exceeds 50 parts by weight.

The soluble starch is suitably used in an amount of 0.1 to 1 part by weight per 100 parts by weight of the mixture of the aforesaid refractory with the binder, because the flowability of the investment slurry becomes insufficient in an amount below 0.1 part by weight, whereas the solidification time of the investment is retarded in an amount exceeding 1 part by weight.

In addition to the aforesaid components, the investments of the present invention may contain ordinarily used additives such as a solidification time regular for hemi-hydrate gypsum, for instance, salts of inorganic acids represented by NaCl or $K_2SO_4$; a solidification accelerator comprising alkali and finely divided dihydrate gypsum; a solidification retarder comprising borax, soda carbonate and colloid; a weight reducing material represented by alumina silica and filite; a coloring agents, and the like with no fear of losing the properties thereof.

EXAMPLES

The present invention will now be explained in further detail with reference to the following examples and comparison examples.

In Examples 1 through 13 and Comparison Examples 1 through 7, the starting materials were weighed and mixed together in a mortar in the compositional proportions specified in Tables to prepare investments. One hundred (100) g of each of the investments of Examples 1 to 8, 12 and 13 and Comparison Examples 1, 2, 3, 6 and 7, in which the binders used were hemi-hydrate gypsum, were mixed with 33 ml of water, and 100 g of each of the investments of Examples 9 to 11 and Comparison Examples 4–5, in which the binders used were a soluble phosphate with magnesium oxide, are mixed with 24 ml of a colloidal silica solution. The thus mixed investments were poured into a cylindrical mould having an inner diameter of 10 mm and a length of 50 mm to prepare thermal expansion samples. From one hour after the commencement of mixing, the samples were measured with a thermal expansion measuring device. Three hours after that, the samples were heated to a temperature of 700° C. for the measurement of their thermal expansion. The compatibility of the investments with respect to Ag and Ni-Cr alloys were measured. As the Ni-Cr alloy, Ticon (Trade Name) manufactured by Taiconium, Co., Ltd. was used. A wax pattern for a single crown was prepared with a clinical model, and was invested in the investments having their compositions specified in the Tables to prepare moulds. Thereafter, the wax was burned out, and casting was carried out a mould temperature of 700° C. As the Ag alloy, Mirosilver (Trade Name) manufactured by GC Dental Industrial Corp. was used. Thereafter, the wax was similarly burned out. Once the mould was heated to 700° C., it was cooled down to 350° C. and cast to thereby measure its compatibility.

For the measurement of cracks in the investments at the time of heating, the aforesaid mixed investments were used. Per one investment were prepared ten cylindrical samples of 20 mm in diameter and 30 mm in height, which were heated from room temperature to 700° C. over about one hour to examine the number of the cracks occurred.

Referring to the burning deposition of the high-melting alloy, the deposition of the investments was visually observed in the compatibility tests of the Ni-Cr alloy, and were estimated in terms of the following three marks.

: No Deposition
Δ: Partial Deposition
X: Complete Deposition

Referring to the flowability of the investments in a slurried state, the investments were compared with one another for their flowability at the time of the preparation of the cylindrical type thermal expansion samples and the investment of the single crown wax patterns.

As regards the drying time of the investments, an investment slurry was poured in a casting ring and, one hour after that, dried on an electronic balance equipped with an infrared dryer until no substantialy change in weight was observed. The time corresponds to the drying time.

The thermal expansion curves of some of the investments of the examples according to the present invention and the comparison examples according to the prior art are given in the drawing.

As can clearly be understood from the Tables, the investments of Examples 1 to 13 in which the raw starch (original starch) and at least one selected from the powdery carbides, nitrides, borides, silicides and sulfides of transition metals of Groups IV, V and VI in the periodic table are added to the refractory.binder combinations as the expanding agents and the investment of Comparison Example 6 in which the raw starch (original starch) alone was used as the expanding agent showed a thermal expansion of 1.8 to 2.2% at 700° C., the figure being larger than a thermal expansion of 0.5 to 1.4% of the investments of Comparison Examples 1 to 5 and 7 consisting only of the refractory.binder combinations showed. As regards the amount of expansion, the investments of the present invention and the investment in which the raw starch (original starch) alone was used as the expanding agent were larger than the conventional investments consisting only of the refractory.binder combinations, as can clearly be seen from Examples —and Comparison Examples 6 and 7 having similar compositions, and were enough to make up for the casting contraction of the dental metals.

The drawing also indicates that the investments of the present invention are more gentle in the expansion curves than the investment using as the expanding agent the raw starch (original starch) alone, and show smaller contraction at the time of cooling. It is thus found that the compatability of the investments of Examples 1 to 13 according to the present invention and the investment using as the expanding agent the raw starch (original starch) alone with respect to the Ni-Cr alloy is better than that of the conventional investments. In particular, the compatibility of the investments of Examples 1 to 13 with respect to the Ag alloy cast by cooling the mould is much better.

Cracking and burning deposition were found in and on the investments of Comparison Examples 1 to 5 and 7 consisting only of the refractory.binder combinations and the investment to which the raw starch (original starch) alone was added as the expanding agent. However, the investments of the present invention showed no sign of any cracking and deposition whatsoever.

The conventional investments required a considerable drying time of 120 to 150 minutes, as in Comparison Examples 1 to 7. However, the investments of Examples 1 to 12 according to the present invention took a drying time of only 10 to 30 minutes, the figure being reduced to ¼ or less of that of the conventional investments.

From the comparison of the investments of Examples 3, 5 and 8 in which the soluble starch was further used with the investments of Examples 1, 2, 4, 6, 7, 9, 10, 11 and 12, it is found that the former investments excel in flowability in a slurried state at the time of the preparation of the cylindrical type thermal expansion samples and the investment of the single crown wax patterns, and are improved in view of manipulation.

| | Binders (wt. part) | Refractories (wt. part) | Expanding Agents (wt. part) Raw Starch (Original Starch) | Expanding Agents (wt. part) Compounds of Transition Metal | Soluble Starch (wt. part) | Thermal Expansion (%) | Compatibility Ag Alloy | Compatibility Ni—Cr Alloy | Number of Cracks | Degree of Burning Deposition | Flowability of Slurry | Drying Time (min.) |
|---|---|---|---|---|---|---|---|---|---|---|---|---|
| Examples | | | | | | | | | | | | |
| 1 | Hemi-hydrate Gypsum 30 | Alumina –70 | Potato Starch 5 | Niobium Carbide 10 | — | 2.2 | Good | Good | 0 | | Good | 20 |
| 2 | Hemi-hydrate Gypsum 25 | Zirconia 50 Alumina 25 | Potato Starch 0.4 Sweet Potato Starch 0.1 | Zirconium Carbide 10 Molybdenum Nitride 30 | — | 1.9 | Good | Good | 0 | | Good | 10 |
| 3 | Hemi-hydrate Gypsum 30 | Alumina 70 | Potato Starch 5 | Niobium Carbide 10 | 0.1 | 2.2 | Good | Good | 0 | | Excellent | 20 |
| 4 | Hemi-hydrate Gypsum 15 | Zirconia 30 Quartz 40 Cristobalite 13 Magnesia Clinkers 2 | Potato Starch 3 Wheat Starch 0.5 Corn Starch 0.5 | Titanium Boride 0.1 | — | 2.1 | Good | Good | 0 | | Good | 30 |
| 5 | Hemi-hydrate Gypsum 25 | Quartz 50 Alumina 25 | Potato Starch 2.5 | Tantalum Nitride 20 Niobium Silicide 5 Titanium Sulfide 5 | 1 | 2.0 | Good | Good | 0 | | Excellent | 15 |
| 6 | Hemi-hydrate Gypsum 5 | Fused Quartz 50 Cristobalite 45 | Potato Starch 1.0 Cassava Starch 0.5 | Tantalum Silicide 20 Zirconium Silicide 5 | — | 1.8 | Good | Good | 0 | | Good | 20 |
| 7 | Hemi-hydrate Gypsum 35 | Quartz 40 Fused Quartz 25 | Potato Starch 2 Sweet Potato Starch 0.5 | Tungsten Carbide 4 Molybdenum Boride 2 Niobium Nitride 1 Zirconium Silicide 0.5 | — | 2.0 | Good | Good | 0 | | Good | 20 |
| 8 | Hemi-hydrate Gypsum 40 | Alumina 30 Cristobalite 30 | Potato Starch 4 | Molybdenum Carbide 20 Chromium Boride 5 Chromium Nitride 2 Tungsten Silicide 1 Vanadium Sulfide 1 | 0.5 | 1.9 | Good | Good | 0 | | Excellent | 15 |
| 9 | Monobasic Ammonium | Quartz | Potato Starch | Titanium Carbide | — | 2.0 | Good | Good | 0 | | Good | 10 |

-continued

| | Binders (wt. part) | Refractories (wt. part) | Expanding Agents (wt. part) | | Soluble Starch (wt. part) | Thermal Expansion (%) | Compatibility | | Number of Cracks | Degree of Burning Deposition | Flowability of Slurry | Drying Time (min.) |
|---|---|---|---|---|---|---|---|---|---|---|---|---|
| | | | Raw Starch (Original Starch) | Compounds of Transition Metal | | | Ag Alloy | Ni–Cr Alloy | | | | |
| | Phosphate 13 Magnesium Oxide 7 | Cristobalite 50 Zirconia 12 Alumina 10 8 | 0.5 | Niobium Boride 20 Zirconium Silicide 10 Tungsten Silicide 10 | — | 1.8 | Good | Good | 0 | | Good | 30 |
| 10 | Monobasic Aluminum Phosphate 3 Magnesium Oxide 5 | Quartz 88 | Potato Starch 2 Sweet Potato Starch 1 Corn Starch 2 | Niobium Carbide 0.1 | — | 2.0 | Good | Good | 0 | | Good | 20 |
| 11 | Monobasic Aluminium Phosphate 13 Magnesium Oxide 7 | Quartz 60 Fused Quartz 20 | Potato Starch 0.5 | Molybdenum Boride 5 Niobium Silicide 3 Tungsten Sulfide 2 | — | 1.8 | Good | Good | 0 | | Good | 30 |
| 12 | Hemi-hydrate Gypsum 30 | Cristobalite 50 Hemi-hydrate Gypsum 20 | Potato Starch 3 | Niobium Carbide 0.2 | — | 1.8 | Good | Good | 0 | | Good | 20 |
| 13 | Hemi-hydrate Gypsum 30 | Quartz 70 | Potato Starch 2.5 | Zirconium Carbide 1.0 | — | 1.8 | Good | Good | 0 | | Good | 20 |
| Comparison Examples | | | | | | | | | | | | |
| 1 | Hemi-hydrate Gypsum 30 | Cristobalite 70 | — | — | — | 1.4 | Poor | Poor | 10 | X* | Good | 120 |
| 2 | Hemi-hydrate Gypsum 3 | Alumina 97 | — | — | — | 0.3 | Poor | Poor | 8 | X | Good | 150 |
| 3 | Hemi-hydrate Gypsum 20 | Quartz 80 | — | — | — | 1.0 | Poor | Poor | 9 | X | Good | 120 |
| 4 | Monobasic Ammonium Phosphate 10 Magnesium Oxide 4 | Zirconia 86 | — | — | — | 1.1 | Poor | Poor | 8 | Δ | Good | 130 |
| 5 | Monobasic Ammonium Phosphate 4 Magnesium Oxide 1 | Zirconia 95 | — | — | — | 0.5 | Poor | Poor | 8 | Δ | Good | 150 |

-continued

| | Binders (wt. part) | Refractories (wt. part) | Expanding Agents (wt. part) | | Soluble Starch (wt. part) | Thermal Expansion (%) | Compatibility | | Number of Cracks | Degree of Burning Deposition | Flowability of Slurry | Drying Time (min.) |
| | | | Raw Starch (Original Starch) | Compounds of Transition Metal | | | Ag Alloy | Ni—Cr Alloy | | | | |
| --- | --- | --- | --- | --- | --- | --- | --- | --- | --- | --- | --- | --- |
| 6 | Hemi-hydrate Gypsum 30 | Quartz 70 | Potato Starch 4 | — | — | 1.8 | Slightly Poor | Good | 5 | Δ | Good | 120 |
| 7 | Hemi-hydrate Gypsum 30 | Quartz 70 | — | — | — | 0.8 | Poor | Poor | 7 | X | Good | 120 |

What is claimed is:

1. An investment for dental casting, in which 0.5 to 5 parts by weight of raw starch and 0.1 to 50 parts by weight of at least one compound selected from the group consisting of carbides, nitrides, borides, silicides and sulfides of transition metals of Groups IV, V and VI in the periodic table are added as expanding agents to 100 parts by weight of a mixture consisting essentially of at least one refractory selected from the group consisting of alumina, zirconia, magnesia clinker, quartz and cristobalite, with either a mixture of a soluble phosphate with magnesium oxide or hemi-hydrate gypsum, which act as a binder.

2. The investment of dental casting according to claim 1, wherein the refractory is alumina.

3. The investment for dental casting according to claim 1, wherein the refractory is zirconia.

4. The investment for dental casting according to claim 1, wherein the refractory is magnesia clinker.

5. The investment of dental casting according to claim 1, wherein the refractory is quartz.

6. The investment for dental casting according to claim 1, wherein the refractory is cristobalite.

7. The investment for dental casting according to claim 1, wherein the quartz is fused quartz.

8. The investment for dental casting according to claim 1, wherein the binder is a mixture of a soluble phosphate with magnesium oxide.

9. The investment for dental casting according to claim 1, wherein the binder is hemi-hydrate gypsum.

10. The investment for dental casting according to claim 1, wherein carbides of a transition metal of Groups IV, V or VI in the periodic table are added as expanding agents.

11. The investment for dental casting according to claim 1, wherein nitrides of a transition metal of Groups IV, V or VI in the periodic table are added as expanding agents.

12. The investment for dental casting according to claim 1, wherein borides of a transition metal of Groups IV, V or VI in the periodic table are added as expanding agents.

13. The investment for dental casting according to claim 1, wherein silicides of a transition metal of Groups IV, V or VI in the periodic table are added as expanding agents.

14. The investment for dental casting according to claim 1, wherein sulfides of a transition metal of Groups IV, V or VI in the periodic table are added as expanding agents.

15. An investment for dental casting, in which 0.5 to 5 parts by weight of raw starch, 0.1 to 50 parts by weight of at least one compound selected from the group consisting of carbides, nitrides, borides, silicides and sulfides of transition metals of Groups IV, V and VI in the periodic table and 0.1 to 1 part by weight of soluble starch are added as expanding agents to 100 parts by weight of a mixture consisting essentially of at least one refractory selected from the group consisting of alumina, zirconia, magnesia clinker, quartz and cristobalite, with either a mixture of a soluble phosphate with magnesium oxide or hemi-hydrate gypsum, which act as a binder.

16. The investment for dental casting according to claim 15, wherein the refractory is alumina.

17. The investment for dental casting according to claim 15, wherein the refractory is zirconia.

18. The investment for dental casting according to claim 15, wherein the refractory is magnesia clinker.

19. The investment for dental casting according to claim 15, wherein the refractory is quartz.

20. The investment for dental casting according to claim 15, wherein the refractory is cristobalite.

21. The investment for dental casting according to claim 15, wherein the quartz is fused quartz.

22. The investment for dental casting according to claim 15, wherein the binder is a mixture of a soluble phosphate with magnesium oxide.

23. The investment for dental casting according to claim 15, wherein the binder is hemi-hydrate gypsum.

24. The investment for dental casting according to claim 15, wherein the carbides of a transition metal of Groups IV, V or VI in the periodic table are added as expanding agents.

25. The investment for dental casting according to claim 15, wherein nitrides of a transition metal of Groups IV, V or VI in the periodic table are added as expanding agents.

26. The investment for dental casting according to claim 15, wherein borides of a transition metal of Groups IV, V or VI in the periodic table are added as expanding agents.

27. The investment for dental casting according to claim 15, wherein the silicides of a transition metal of Groups IV, V or VI in the periodic table are added as expanding agents.

28. The investment for dental casting according to claim 15, wherein the sulfides of a transition metal of Groups IV, V or VI in the periodic table are added as expanding agents.

* * * * *